(12) United States Patent
Andelin et al.

(10) Patent No.: US 10,248,895 B2
(45) Date of Patent: Apr. 2, 2019

(54) MAGNETIC STRIPE CARD WITH INCREASED DURABILITY

(71) Applicant: MorphoTrust USA, LLC, Billerica, MA (US)

(72) Inventors: Victor L. Andelin, Kendallville, IN (US); Robert Jones, Andover, MA (US); Daoshen Bi, Boxborough, MA (US)

(73) Assignee: MorphoTrust USA, LLC, Billerica, MA (US)

( * ) Notice: Subject to any disclaimer, the term of this patent is extended or adjusted under 35 U.S.C. 154(b) by 0 days.

(21) Appl. No.: 15/247,227

(22) Filed: Aug. 25, 2016

(65) Prior Publication Data

US 2017/0061269 A1 Mar. 2, 2017

Related U.S. Application Data

(60) Provisional application No. 62/209,832, filed on Aug. 25, 2015.

(51) Int. Cl.
*G06K 19/06* (2006.01)
*G06K 19/077* (2006.01)
(Continued)

(52) U.S. Cl.
CPC .......... *G06K 19/022* (2013.01); *B32B 7/12* (2013.01); *B32B 27/304* (2013.01);
(Continued)

(58) Field of Classification Search
CPC .......... G06K 19/07722; G06K 19/02; G06K 19/06187; G06K 19/06196;
(Continued)

(56) References Cited

U.S. PATENT DOCUMENTS 5,023,291 A 6/1991 Sakamoto et al.
5,698,284 A * 12/1997 Kubota ............ G06K 19/06046
369/275.5
(Continued)

FOREIGN PATENT DOCUMENTS

JP 06072082 A * 3/1994
JP 09251745 A * 9/1997
(Continued)

OTHER PUBLICATIONS

English equivalent machine translation of JP 06072082 A, retrieved Jan. 18, 2017, https://worldwide.espacenet.com/publicationDetails/biblio?CC=JP&NR=H0672082A&KC=A&FT=D&ND=3&date=19940315&DB=EPODOC&locale=en_EP#.*
(Continued)

*Primary Examiner* — Suezu Ellis
(74) *Attorney, Agent, or Firm* — Fish & Richardson P.C.

(57) ABSTRACT

A card with a magnetic stripe and increased durability is described. A protective lamina or coating may be disposed on a card with a magnetic stripe to protect the magnetic stripe embedded into the card from scratches, fractures, or chemical damage. An adhesive in the protective lamina is compatible with a material composition of the magnetic stripe such that the bond established onto the card surface is also accomplished with the magnetic stripe. The magnetic stripe has high coercivity and is overlaminated. The overlamination is performed across the entire rear side of the card. Accordingly, stress lines in cards with magnetic stripes can be avoided thereby significantly reducing cracking and fractures in cards.

19 Claims, 6 Drawing Sheets

(51) Int. Cl.
  *B32B 27/36* (2006.01)
  *G06K 19/02* (2006.01)
  *B32B 7/12* (2006.01)
  *B32B 27/30* (2006.01)

(52) U.S. Cl.
  CPC ...... *B32B 27/365* (2013.01); *G06K 19/06196* (2013.01); *G06K 19/07722* (2013.01); *B32B 2425/00* (2013.01)

(58) Field of Classification Search
  CPC ... Y10S 283/904; B32B 27/36; B32B 27/365; B32B 2425/00
  USPC .................................. 235/487, 488, 492, 493
  See application file for complete search history.

(56) References Cited

U.S. PATENT DOCUMENTS

| | | | | |
|---|---|---|---|---|
| 2002/0145049 A1* | 10/2002 | Lasch | ..................... | G06Q 20/00 235/488 |
| 2004/0066441 A1* | 4/2004 | Jones | ......................... | B41J 3/60 347/101 |
| 2004/0234816 A1* | 11/2004 | Azakami | .......... | G06K 19/06196 428/844.6 |
| 2005/0035590 A1* | 2/2005 | Jones | ..................... | B42D 25/41 283/74 |
| 2005/0091088 A1* | 4/2005 | Peterson | ................ | G07B 15/00 705/5 |
| 2006/0251869 A1* | 11/2006 | Herslow | ................... | B32B 3/08 428/204 |
| 2007/0089831 A1* | 4/2007 | Florentino | ................ | B32B 3/30 156/272.4 |
| 2015/0180229 A1* | 6/2015 | Herslow | .......... | G06K 19/07749 361/56 |

FOREIGN PATENT DOCUMENTS

| | | | |
|---|---|---|---|
| JP | 2002293067 A | * | 10/2002 |
| JP | 2003211873 A | * | 7/2003 |
| JP | 2008112272 A | * | 5/2008 |

OTHER PUBLICATIONS

English equivalent machine translation of JP 2002293067 A, retrieved Jan. 19, 2017, https://worldwide.espacenet.com/publicationDetails/biblio?CC=JP&NR=2002293067A&KC=A&FT=D&ND=3&date=20021009&DB=EPODOC&locale=en_EP.*

English equivalent machine translation of JP 2003211873 A, retrieved Jan. 19, 2017, https://worldwide.espacenet.com/publicationDetails/biblio?DB=EPODOC&II=0&ND=3&adjacent=true&locale=en_EP&FT=D&date=20030730&CC=JP&NR=2003211873A&KC=A#.*

English equivalent machine translation of JP 09251745 A, retrieved Jan. 18, 2017, https://worldwide.espacenet.com/publicationDetails/biblio?DB=EPODOC&II=0&ND=3&adjacent=true&locale=en_EP&FT=D&date=19970922&CC=JP&NR=H09251745A&KC=A#.*

English equivalent machine translation of JP 2008-112272, retrieved May 14, 2018, European Patent Office translation, https://worldwide.espacenet.com/publicationDetails/biblio?CC=JP&NR=2008112272A&KC=A&FT=D&ND=3&date=20080515&DB=EPODOC&locale=en_EP#.*

* cited by examiner

MAGNETIC STRIPE CARD WITH INCREASED DURABILITY

CROSS REFERENCE TO RELATED APPLICATION

This application claims priority from and the benefit of U.S. Provisional Application No. 62/209,832, filed on Aug. 25, 2015, which is incorporated by reference herein.

FIELD

This disclosure generally relates to cards with a magnetic stripe.

BACKGROUND

Cards with a magnetic stripe are widely used. For example, credit cards with a magnetic stripe can be used at grocery stores, electronic stores, restaurants, electronic payment kiosks, etc. However, as cards with magnetic stripes are increasingly used in different environments and machines, these cards can be damaged due to fractures, cracks, scratches, or chemical damage. Accordingly, improved protection for cards with magnetic stripes is desirable.

SUMMARY

This disclosure generally describes magnetic stripe cards with increased durability.

Innovative aspects of the subject matter described in this specification may, in some implementations, be embodied in an apparatus that includes a base structure, a magnetic stripe, and a laminating layer. The magnetic stripe is disposed on one side of the base structure and stores encoded data. The laminating layer is disposed on the magnetic stripe and each portion of the one side of the base structure. The laminating layer includes an adhesive that bonds the laminating layer to the magnetic stripe and to each portion of the one side of the base structure.

In some implementations, a thickness of the laminating layer is between 48 gauge to 60 gauge.

In some implementations, a coercivity of the magnetic stripe is about 2750 Oersteds.

In some implementations, the base structure includes a polyvinyl chloride layer formed between polycarbonate layers, and Dye Diffusion Thermal Transfer layers disposed on the polycarbonate layers.

In some implementations, the apparatus is a card and the one side is a rear side of the card. The encoded data includes personal identification information of a card holder associated with the card.

In some implementations, the laminating layer includes a lamina formed using a bi-axially oriented, polyester material.

In some implementations, the adhesive is formed between first portions of the lamina and the magnetic stripe and between second portions of the lamina and a surface of the one side of the base structure. The first portions are different than the second portions.

In some implementations, one or more protection layers are disposed on a second side of the base structure. The one or more protection layers include a second laminating layer. The second side is an opposite side of the base structure relative to the one side.

According to some implementations, a method of manufacturing a magnetic stripe card is disclosed. The method includes disposing a magnetic stripe on one side of a base structure, encoding data in the magnetic stripe, and disposing a laminating layer on the magnetic stripe and each portion of the one side of the base structure. The laminating layer includes an adhesive that bonds the laminating layer to the magnetic stripe and to each portion of the one side of the base structure.

In some implementations, the method further includes forming the base structure that includes a polyvinyl chloride layer disposed between polycarbonate layers, and disposing Dye Diffusion Thermal Transfer layers on the polycarbonate layers.

In some implementations, the operation of forming the base structure that includes a polyvinyl chloride layer disposed between polycarbonate layers includes applying a long roll and sheet lamination of polycarbonate on the polyvinyl chloride layer.

In some implementations, the method further includes forming the magnetic stripe using ferrite magnetic particles bound together in a resin. The magnetic stripe has a coercivity of about 2750 Oersteds.

In some implementations, disposing the laminating layer on the magnetic stripe includes applying a roll of lamina on the entire one side of the base structure. The lamina includes a bi-axially oriented, polyester material.

In some implementations, the base structure is a core of a card associated with a card holder. The operation of encoding data in the magnetic stripe includes encoding personal identification information associated with the card holder in the magnetic stripe.

In some implementations, the method further includes disposing one or more protection layers on a portion of or the entire surface of a second side of base structure. The one or more protection layers are disposed on a Dye Diffusion Thermal Transfer layer of the base structure.

In some implementations, the one or more protection layers includes a second laminating layer. The second laminating layer is disposed on an entire surface of the second side of the base structure. The second side is an opposite side of the base structure relative to the one side.

According to some implementations, a card includes a polyvinyl chloride layer, polycarbonate layers, Dye Diffusion Thermal Transfer layers, a magnetic stripe, and a lamina layer. The polycarbonate layers are disposed on a first side and a second side of the polyvinyl chloride layer. The first side corresponds to a first side of the card and the second side corresponds to a second side of the card that faces a direction opposite to a direction that the first side of the card faces. The Dye Diffusion Thermal Transfer layers are disposed on the polycarbonate layers. The magnetic stripe is disposed on the second side of the card and stores encoded data. The lamina layer is disposed on the magnetic stripe and each portion of the second side of the card. The lamina layer includes an adhesive that bonds the lamina layer to the magnetic stripe and to each portion of the second side of the card.

In some implementations, a thickness of the lamina layer is between 48 gauge to 60 gauge, and a coercivity of the magnetic stripe is about 2750 Oersteds.

In some implementations, the adhesive is formed between first portions of the lamina layer and the magnetic stripe and between second portions of the lamina layer and a surface of the second side of the card. The first portions are different than the second portions.

Other implementations include corresponding systems, methods, and apparatus having the above-noted features.

The details of one or more implementations are set forth in the accompanying drawings and the description below. Other features and advantages will become apparent from the description, the drawings, and the claims.

BRIEF DESCRIPTION OF THE DRAWINGS

Like reference numbers and designation in the various drawings indicate like elements.

DETAILED DESCRIPTION

Figure 1:
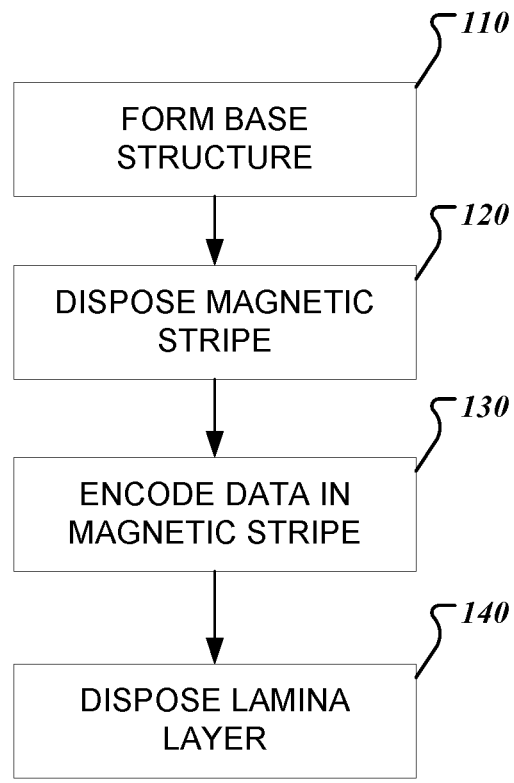
FIG. 1 illustrates a flowchart of a method for providing a magnetic stripe card with increased durability.

This disclosure generally describes a magnetic stripe card with extra protection and durability, and a method of manufacturing the magnetic stripe card.

According to implementations, a protective lamina or coating may be disposed on a card with a magnetic stripe to protect the magnetic stripe from scratches, fractures, or chemical damage. In particular, according to implementations, a magnetic stripe can be embedded into a card structure and then overlaminated. The adhesive in the overlaminant is compatible with a material composition of the magnetic stripe so that the bond established onto the card surface is also accomplished with the magnetic stripe. The magnetic stripe has high coercivity and is overlaminated after user personalization. The overlamination is performed across the entire rear side of the card and provisions magnetic stripe information to be read through the overlaminant. Accordingly, stress lines in cards with magnetic stripes can be avoided thereby significantly reducing cracking and fractures in cards.

In general, the implementations described herein may apply to various suitable types of documents, tags, maps, labels, and cards, including but not limited to, banking cards, smart cards, license cards, membership cards, identification (ID) documents, and any other card having a magnetic stripe. Examples of cards having magnetic stripes include, for example, credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, radio frequency (RF) ID cards, security clearance badges and cards, gun permits, gift certificates or cards, membership cards or badges, etc. These cards may include various types of personal information including, for example, a membership or employer number, personal identification information such as a name, address, photograph, birth date, signature, finger print, a passcode, a security code, iris scan, or biometric data associated with a person, party, or entity. In some implementations, the personal information may be encoded in the magnetic strip. The cards may be assigned to, designated for, or possessed by a user or card holder whose information, in some cases, may be encoded in the magnetic stripe.

In some implementations, electronic circuitry, such as a microprocessor, memory, or antenna, may be implemented in the documents, tags, maps, labels, or cards that have a magnetic stripe. The electronic circuitry may provide the capability to implement one of more functions, including but not limited to, manipulation or processing data and storing or provision of personal information.

The various suitable types of documents, tags, maps, labels, and cards having a magnetic stripe may be issued from central issuers (CI) or over-the-counter (OTC) issuers. An OTC-issued ID card may be generated immediately after collecting data to be provided by the card. A CI-issued ID card may not be immediately provided to a card holder, but may be provided to a card holder from a central location after a certain period of time has lapsed. For example, in some implementations, a card holder may report to a card-issuing station where data is collected, the data is forwarded to a central location where the card is produced with a magnetic stripe. The central location is a location of an assembly process or a bulk-processing facility where cards with magnetic stripes are produced. The card, including the magnetic stripe, may then be forwarded to a card holder through any suitable method.

Figure 2:
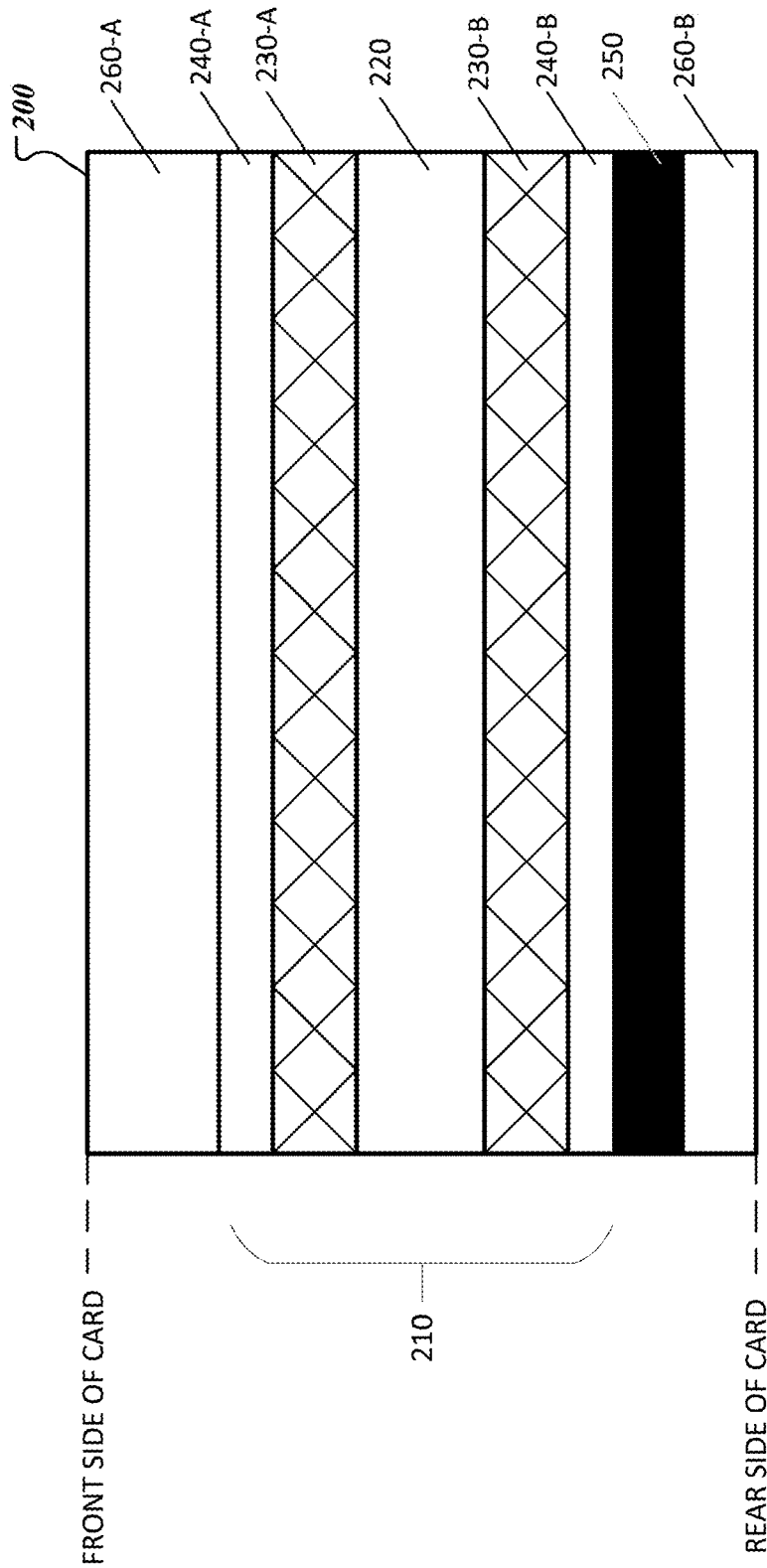
FIG. 2 illustrates a profile of a magnetic stripe card structure.

Referring to FIGS. 1 and 2, a base structure may be formed in a card 200 (110). The base structure 210 may be formed of various suitable materials including, for example, light-colored opaque materials. In some implementations, the base structure includes a Polycarbonate/Polyvinyl Chloride (PVC)/Polycarbonate structure. For example, a PVC layer 220 may be disposed between two polycarbonate layers 230-A, 230-B and may include one or more pre-printed patterns. The card 200 may be formed using various suitable techniques including, for example, using a combination long roll and sheet lamination consisting of a Polycarbonate front and Polycarbonate back. Dye Diffusion Thermal Transfer (D2T2) receiver layers 240-A, 240-B may be disposed on the front and rear polycarbonate surfaces of the card 200.

The base structure 210 and layers therein may have various suitable thicknesses. For example, in some implementations, the Polycarbonate/Polyvinyl Chloride (PVC)/Polycarbonate structure may be up to 30 mils thick. In some implementations, information may be imprinted in the base structure 210 using various suitable techniques such as, for example, D2T2 printing and other laser writing methods. Information may be printed on the front side or the back side of the card 200.

Figure 3:
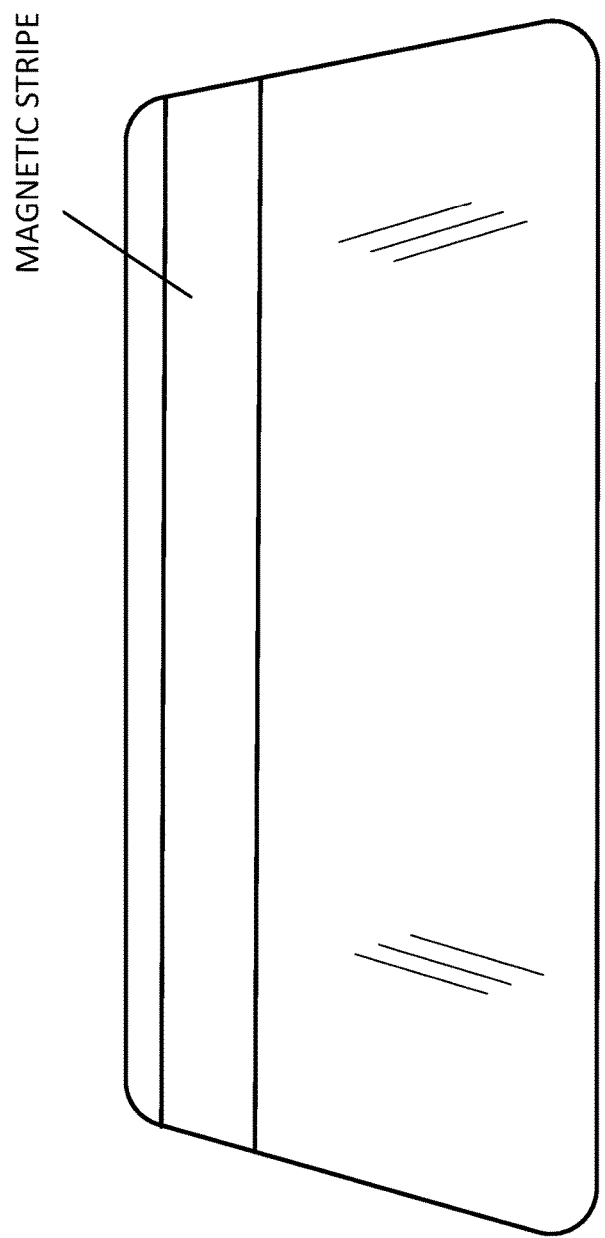
FIG. 3 depicts the rear side of a card with an embedded magnetic stripe.

A magnetic stripe 250 may be disposed on the rear side of the card 200 (120). An image of a card 200 having a magnetic stripe 250 is shown in FIG. 3. In particular, FIG. 3 illustrates an example of a rear side of a card 200 with a magnetic stripe 250 embedded on a D2T2 receiver layer on the card surface.

A magnetic stripe 250 may be formed using tiny ferrite magnetic particles bound together in a resin. The density of the particles in the resin is one of the controlling factors for a data signal amplitude. For example, the higher the density of the particles, the higher the data signal amplitude. The particles may be applied directly to the card 200 or made into a stripe on a plastic backing which is applied to the card 200. The magnetic material used to form the magnetic stripe 250 may depend on a coercivity of the magnetic stripe 250 and an expected data signal amplitude. Additional factors determining the design of the magnetic stripe 250 include bit density and encoding method.

While magnetic stripes used frequently in banking cards have low coercivity (e.g., approximately 300 Oersteds (Oe)), higher coercivity with values of, for example, 2750 Oe, to improve utility and performance of the card 200 is desired. The magnetic stripe 250 applied to the rear side of the card 200 is a magnetic stripe with high output coercivity (e.g., 2750, 3600 and 4000 Oe). In some implementations, the magnetic stripe 250 may be a 190 percent High Output 2750 Oe Coercivity Magnetic Stripe.

In some implementations, one or more additional layers may be included in the card structure. For example, in some cases, a multi-layer tie structure may be incorporated into the card structure. Layers providing added features, such as security related features and pre-printed patterns, may also be incorporated into the card 200.

The magnetic stripe 205 may then be encoded with data (130). This data may include various types of information including, for example, any cardholder related data, personal identification information, security information, membership information, etc. Each character that is encoded in the magnetic stripe 250 is made of a number of bits. The polarity (e.g., North or South) of the magnetic particles in the stripe are changed to define each bit. In general, various suitable encoding techniques may be used. In some implementations, a three Track American Association for Motor Vehicle Administrators (AAMVA) Standard for Mag Stripes may be used for the encoding.

Figure 4:
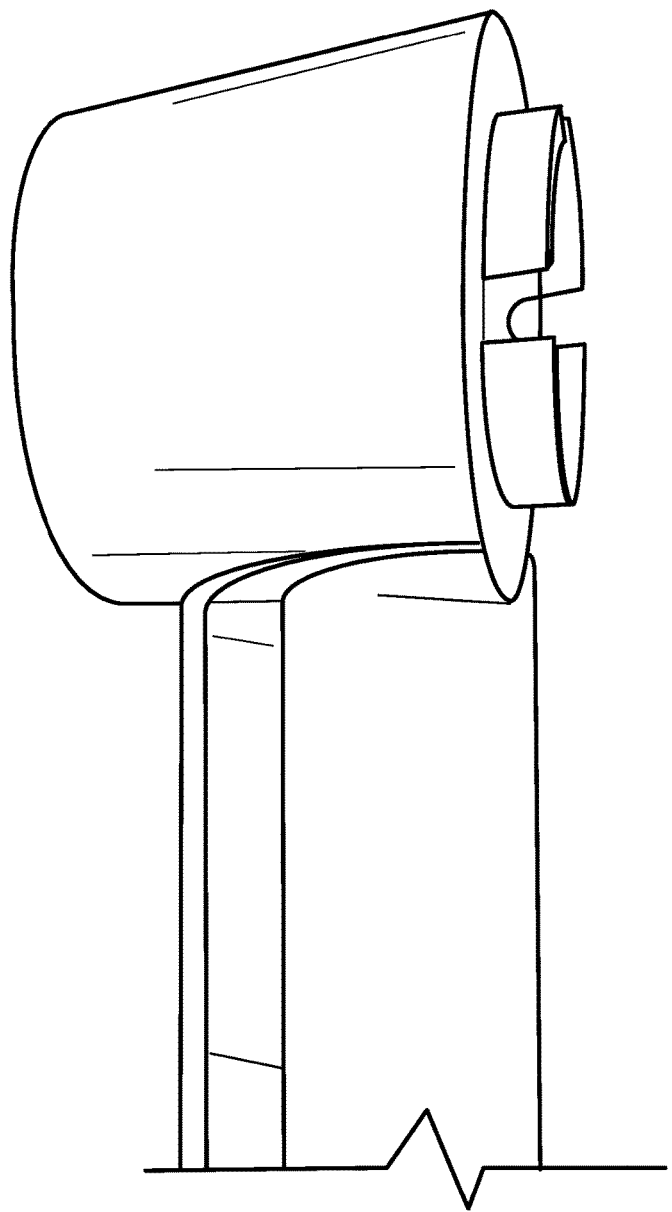
FIG. 4 depicts an overlaminant with special thermal adhesive laminated onto a rear surface of a card.

After encoding the magnetic stripe 250, a clear, long roll lamina 260-B is disposed on the rear side of the card 200 as shown in FIG. 4 (140). The lamina 260-B may be applied to the entire rear surface of the card 200. In some implementations, the lamina 260-B may be formed using a bi-axially oriented, polyester material. The lamina 260-B may have various suitable thicknesses, and may, in some cases, be in the 48 gauge to 60 gauge thickness range.

In some implementations, the lamina 260-B, also referred to as an overlaminant, may have one or more layers. The one or more layers may have different characteristics such as varying melting points, solubilities, durabilities, chemical and physical resistances, and structures. In some implementations, the lamina 260-B may include an adhesive layer. In general, various suitable types of adhesives that are completely compatible with the material composition of the magnetic stripe 250 may be used. The adhesive establishes strong bonds with the magnetic stripe 250 as well as the card surface. The lamina 260-B may be formed so that the adhesive layer is a bottom most layer of the lamina 260-B and contacts the magnetic card stripe 250 and portions of the rear surface of the card on which the magnetic card stripe 250 is not formed.

Figure 5:
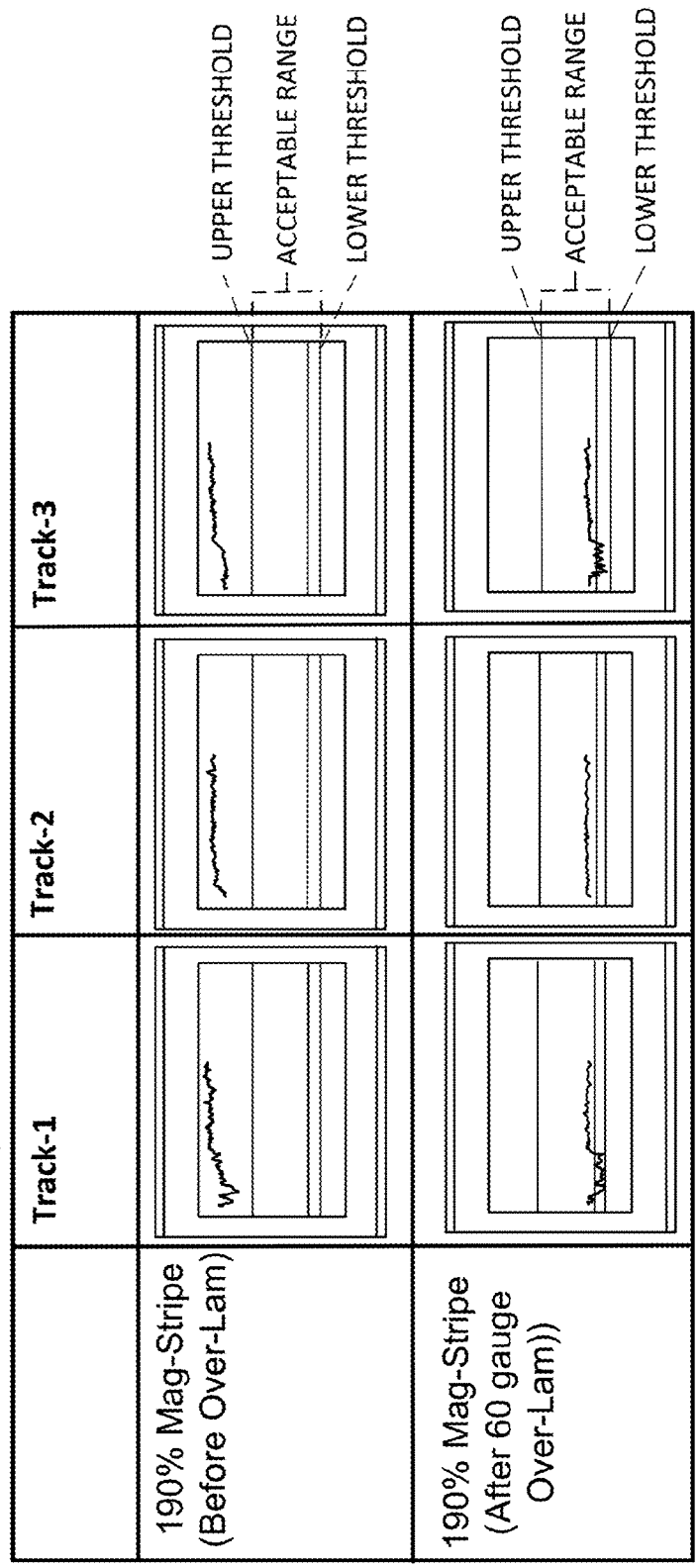
FIG. 5 depicts a Data Amplitude measurement before and after applying an overlaminant.

Application of the lamina 260-B improves the ability for magnetic card readers to extract information from the magnetic card stripe 250. For example, as shown in FIG. 5, before overlamination, a data signal output from a 190% high output magnetic stripe is above an upper limit for the acceptable range of amplitude readings set forth by the International Organization for Standardization (ISO) Standards for a High Coercivity Mag Stripe. After overlamination, the data signal output from the 190% high output magnetic stripe is within an acceptable range of amplitude readings.

Figure 6:
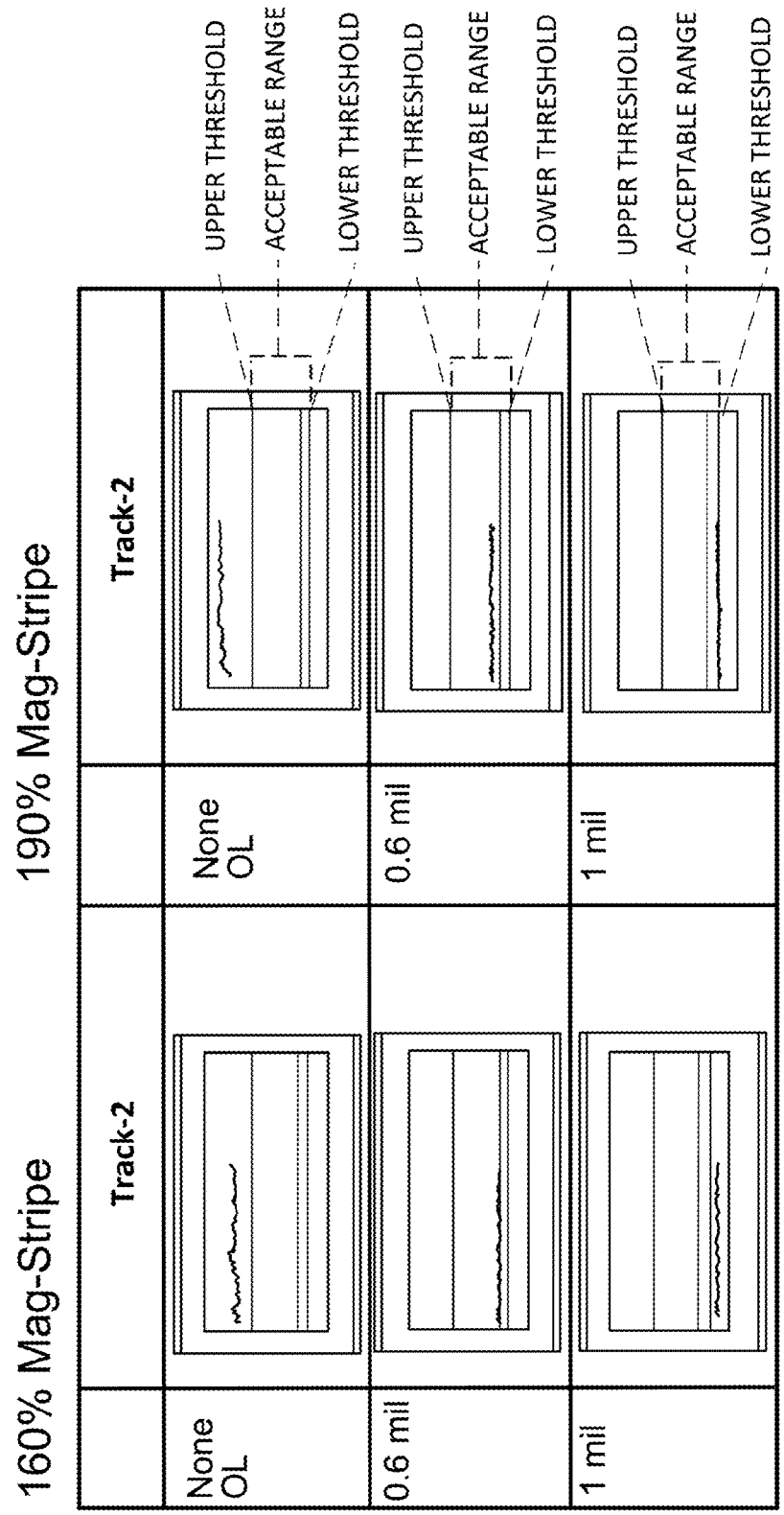
FIG. 6 depicts an effect of the overlaminant thickness on the data signals.

In addition, because data encoded in a magnetic stripe 250 is sensitive to the distance of a reader head to a magnetic stripe, a thickness of the lamina 260-B on the magnetic stripe 250 has an impact on the data signal amplitude. Various thickness of a Polycarbonate lamina layer are illustrated in FIG. 6. As shown in FIG. 6, 0 and 1 mil thicknesses result in data signal amplitudes that are respectively above or below the acceptable range of amplitude readings. The 0.6 mil thickness provides the ability to recover data signal amplitudes within the acceptable range of amplitude readings. In general, the 48 gauge to 60 gauge thickness range of the lamina 260-B provides a strong data signal amplitude enabling a magnetic card reader to read data from the magnetic stripe 250.

In some implementations, one or more additional protection layers 260-A may also be disposed on a portion of or the entire front surface of the card 200 to protect the card from both sides. In some implementations, layer 260-A may be a Polycarbonate layer or any other suitable protection layer.

In some implementations, the magnetic card stripe 250 may be encoded after disposing the layer 260-B thereby allowing the card 200 to be further configured and used after layer 260-B has been disposed.

The above-described implementations provide various benefits to card holders. The magnetic stripe 250 having a high coercivity may be laminated into a card body construction flush with its surface and overlaminated after personalization. This full back overlamination at a suitable caliper then allows magnetic stripe information to be read through the overlaminate. The protective lamina 260 applied over the top of the magnetic stripe 250 provides a significant boost to durability while still allowing the magnetic stripe 250 to be encoded and read through the protective lamina 260 in everyday use. Stress lines that are commonplace in magnetic stripe cards are eliminated in the above-described implementations thereby significantly reducing chances of cracking or fracturing of a card 200. The above-described implementations also provide reduction in jitter problems associated with cards having magnetic stripes. Businesses offering magnetic stripe cards can also benefit by saving time and resources allocated to replacing cards for members. In some cases, the durability of the card 200 may be extended to at least 10 years.

While this specification contains many specifics, these should not be construed as limitations on the scope of the disclosure or of what may be claimed, but rather as descriptions of features specific to particular implementations. Certain features that are described in this specification in the context of particular implementations may also be implemented in combination with other implementations. Various features that are described in the context of a single implementation may be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

A number of implementations have been described hereinabove. However, it should be understood that various modifications may be made without departing from the spirit and scope of the disclosure. Accordingly, other implementations are within the scope of the disclosure and claims.

What is claimed is:
1. An apparatus comprising:
 a base structure comprising a first dye receiver layer on a first side of the base structure and a second dye receiver layer on a second side of the base structure;

a magnetic stripe directly disposed on the second dye receiver layer of the base structure and configured to store encoded data; and a laminating layer disposed on the magnetic stripe that is disposed on the second dye receiver layer, the laminating layer being disposed on the entire second side of the base structure, the laminating layer comprising an adhesive layer that bonds the laminating layer to (i) the magnetic stripe and (ii) the entire one side of the base structure, the laminating layer comprising bi-axially oriented, polyester material and the adhesive layer bonding with ferrite particles in the magnetic stripe.

2. The apparatus of claim 1, wherein:
a thickness of the laminating layer is between 48 gauge to 60 gauge.

3. The apparatus of claim 1, wherein a coercivity of the magnetic stripe is about 2750 Oersteds.

4. The apparatus of claim 1, wherein the first dye receiver layer is disposed on a first polycarbonate layer and the second dye receiver layer is disposed on a second polycarbonate layer.

5. The apparatus of claim 1, wherein the apparatus comprises a card and the second side is a rear side of the card, and
wherein the encoded data comprises personal identification information of a card holder.

6. The apparatus of claim 1, wherein the adhesive layer is formed between first portions of the laminating layer and the magnetic stripe and between second portions of the laminating layer and a surface of the second side of the base structure, the first portions being different than the second portions.

7. The apparatus of claim 1, further comprising:
one or more protection layers disposed on the first side of the base structure, wherein:
the one or more protection layers comprise a second laminating layer; and
the first side is an opposite side of the base structure relative to the second side.

8. The apparatus of claim 1, wherein the laminating layer is configured to provide card durability and magnetic stripe durability for a period of about ten years beginning from a time the apparatus is manufactured.

9. A method comprising:
disposing a dye receiver layer on one side of a base structure;
disposing a magnetic stripe directly on the dye receiver layer;
encoding data in the magnetic stripe; and
disposing a laminating layer on the magnetic stripe and the entire one side of the base structure by applying a roll of the laminating layer on the entire one side of the base structure,
wherein the laminating layer includes an adhesive layer that bonds the laminating layer to (i) the magnetic stripe and (ii) the entire one side of the base structure, the laminating layer comprising bi-axially oriented, polyester material and the adhesive layer bonding with ferrite particles in the magnetic stripe.

10. The method of claim 9, further comprising:
disposing a plurality of dye receiver layers, including the dye receiver layer disposed on the one side of the base structure, respectively, on polycarbonate layers in the base structure.

11. The method of claim 10, further comprising:
disposing one or more protection layers on a portion of or the entire surface of a second side of the base structure, the one or more protection layers being disposed on the dye receiver layers of the base structure.

12. The method of claim 11, wherein:
the one or more protection layers comprises a second laminating layer;
the second laminating layer is disposed on an entire surface of the second side of the base structure; and
the second side is an opposite side of the base structure relative to the one side.

13. The method of claim 9, further comprising:
forming the magnetic stripe using the ferrite particles bound together in a resin, the magnetic stripe having a coercivity of about 2750 Oersteds.

14. The method of claim 9, wherein a thickness of the laminating layer is between 48 gauge to 60 gauge.

15. The method of claim 9, wherein the base structure is a core of a card associated with a card holder, and
wherein encoding data in the magnetic stripe comprises encoding personal identification information associated with the card holder in the magnetic stripe.

16. A card comprising:
a first polycarbonate layer disposed on a first side of the card;
a second polycarbonate layer disposed on a second side of the card that faces a direction opposite to a direction that the first side of the card faces;
a first dye receiver layer disposed on the first polycarbonate layer;
a second dye receiver layer disposed on the second polycarbonate layer;
a magnetic stripe directly disposed on the second dye receiver layer on the second side of the card and configured to store encoded data; and
a lamina layer disposed on the magnetic stripe and the entire second side of the card, the lamina layer comprising an adhesive layer that bonds the lamina layer to (i) the magnetic stripe and (ii) the entire second side of the card, the lamina layer comprising bi-axially oriented, polyester material and the adhesive layer bonding with ferrite particles in the magnetic stripe.

17. The card of claim 16, wherein:
a thickness of the lamina layer is between 48 gauge to 60 gauge; and
a coercivity of the magnetic stripe is about 2750 Oersteds.

18. The card of claim 16, wherein:
the adhesive layer is formed between first portions of the lamina layer and the magnetic stripe and between second portions of the lamina layer and a surface of the second side of the card, the first portions being different than the second portions.

19. The card of claim 16, wherein the lamina layer is configured to provide card durability and magnetic stripe durability for a period of about ten years beginning from a time the card is manufactured.

* * * * *